United States Patent [19]
Jones et al.

[11] Patent Number: 5,746,465
[45] Date of Patent: May 5, 1998

[54] METHOD AND APPARATUS FOR MOVING A PHYSICALLY DISABLED PERSON TO AND FROM A DRIVING POSITION WITHIN A VEHICLE

[75] Inventors: David L. Jones, Houston; George L. Drenner, Jr., Sugarland, both of Tex.

[73] Assignee: Mobility Plus, Inc., Houston, Tex.

[21] Appl. No.: 551,901

[22] Filed: Oct. 23, 1995

[51] Int. Cl.$^6$ ....................................................... B60N 1/10
[52] U.S. Cl. .................................. 296/65.1; 297/344.13; 297/344.24; 414/921
[58] Field of Search ...................... 296/65.1; 297/DIG. 4, 297/344.13, 344.12, 344.24, 344.21; 248/419; 414/540, 462, 542, 921; 280/289, 650, 250.1; 180/6.5

[56] References Cited

U.S. PATENT DOCUMENTS

| | | |
|---|---|---|
| 3,515,294 | 6/1970 | Southward et al. . |
| 4,155,587 | 5/1979 | Mitchell . |
| 4,170,368 | 10/1979 | Southward et al. . |
| 4,306,634 | 12/1981 | Sangster . |
| 4,365,924 | 12/1982 | Brigman et al. . |
| 4,479,752 | 10/1984 | Todd . |
| 4,483,653 | 11/1984 | Waite . |
| 4,669,943 | 6/1987 | Zamotin . |
| 4,815,785 | 3/1989 | Goodall et al. . |
| 4,905,327 | 3/1990 | Boublil . |

OTHER PUBLICATIONS

Mobility Products Corporation, *EZ RIZER™ Seat Lift System*, 1993.
Bruno® Independent Living Aids, Inc., *Transfer In And Out of Your Mini-Van The Easy Way . . . Using the Vertical Pow'r-Seat Base™*, 1990.

*Primary Examiner*—David M. Mitchell
*Attorney, Agent, or Firm*—Vaden, Eickenroht & Thompson, L.L.P.

[57] ABSTRACT

A method and apparatus are provided for transferring a physically disabled person through a vehicle's driver side door opening to and from a driving position behind the steering wheel of the vehicle. The method and apparatus contemplate the use of a seat assembly, including a seat having a back support, a seat frame, and lift means for lifting and lowering the seat relative to the seat frame. A hinge assembly is mounted inside the vehicle for pivoting the seat assembly about a vertical axis and supports the weight of the seat assembly. The lift means is slidable relative to the hinge assembly. Powered means are mounted to a floor within the vehicle for rotating the seat assembly via the hinge assembly between an outwardly facing position, wherein the lift seat may be lifted or lowered by the lift means outside the vehicle, and an intermediate forwardly facing position inside the vehicle. The powered means also provide for lateral movement of the seat assembly between the intermediate forwardly facing position and a driving position behind the vehicle's steering wheel.

9 Claims, 3 Drawing Sheets

METHOD AND APPARATUS FOR MOVING A PHYSICALLY DISABLED PERSON TO AND FROM A DRIVING POSITION WITHIN A VEHICLE

BACKGROUND OF THE INVENTION

1. Field of the Invention

This invention relates to apparatus for and a method of moving physically disabled persons, such as wheelchair-bound individuals, to and from a sitting position within a vehicle, particularly a driving position behind the steering wheel of the vehicle.

2. The Related Art

There are a number of devices on the market that enable physically disabled persons to get into and out of the driver's seat of a motor vehicle. Many of these devices are commonly used and offer significant assistance, but few of them specifically provide powered assistance for moving such a person between a conveniently accessible position outside the vehicle and a driving position behind the vehicle's steering wheel.

One device that provides such assistance is described in U.S. Pat. No. 4,155,587 ('587). In this patent, a movable automobile seat is disclosed that includes a base plate secured to the floor of the automobile behind its steering wheel, a trolley movable on the base plate, and a seat mounted on the trolley for carrying the user. The base plate is provided with guide means that confine the horizontal motion of the seat to a predefined course between a position behind the steering wheel and a position extending through the driver's side front door opening and rotated 90° where the seat can be lowered to a position close to the ground.

The mechanism for pivoting the seat between the two positions takes up nearly the entire space between the seat and the back cushion of the back seat of a four door automobile. A pivot post supports a linkage that rotates the seat between the two positions and is supported at its upper end by an "angle" that extends "front to rear in the vehicle from the front door post to the rear door post." A hydraulic cylinder pivots a pair of levers that move the seat along cam tracks that rotate the seat 90° as it is moved from behind the steering wheel into the open front door. Thus, the hydraulic assembly and linkage of the '587 patent take up considerable space within the automobile, particularly behind the driving position in which the seat is placed. This positioning of the hydraulic assembly and linkage is necessitated by the dependence of the device on the baseplate course, because the most advantageous location from which to move a vehicle along a track is at the head or the tail of the vehicle in the line of the track. This is particularly true with the '587 patent's selected method of locomotion, the pivotable hydraulic cylinder that pushes or pulls the seat along the curved line of the baseplate course. Passenger seating and/or cargo area behind the driver's seat is virtually eliminated by this design. It is also clear that the apparatus of the '587 patent is not suitable for all automobiles, such as compact cars and those vehicles having transmission "humps" in the floor that would interfere with the footprint of the baseplate.

Furthermore, the apparatus of the '587 patent is fairly complex and includes several moving parts that are subject to wear and failure. For example, the hydraulic cylinder is pivotally supported at its forward end by a bracket so as to accommodate the changing path of the seat trolley as it travels over the baseplate course. Bearing tubes serve as double pivot points that enable the trolley to negotiate the baseplate course. The trolley is supported for motion on the baseplate by a ball caster adjacent its forward end, and also carries a guide roller that engages the outer track of the baseplate course to facilitate motion of the trolley.

Another related apparatus is described in U.S. Pat. No. 4,483,653 ('653). The '653 patent describes a mechanism for transferring a wheelchair having retractable wheels through a side door opening of a motor vehicle, including a hoist disposed in the vehicle and a linkage connecting the wheelchair to the hoist. The linkage includes a sleeve that carries two linkage arms, and is slid up and down a vertical tube by way of the hoist. Thus, the linkage is lifted and lowered with the chair while the hoist remains secured to the floor of the vehicle. Unlike the '587 patent, once the wheelchair is lifted by the hoist, there is no powered means for moving the wheelchair to a driving position within the vehicle. Rather, the wheelchair is manually swung and pivoted via the linkage for positioning the occupant behind the steering wheel.

Another known apparatus for assisting individuals into a driving position is Mobility Products Corporation's "EZ RIZER™ Seat Lift System." In this system, which is adapted for use with a vehicle's original equipment driver's seat, a fold-down seat is mounted between the driver's seat and the driver's door of the vehicle for folding down to a position to support the driver when the vehicle door is open. The fold-down seat is movable under power between a lower position to allow the user to move between the seat and a wheelchair, and an upper position where the user can move to and from the vehicle's driver seat. Thus, the user of the EZ RIZER™ must transfer him/herself to and from the fold-down seat in the raised position as well as move on and off the seat in its lowered position using only arm strength or the assistance of another person. No means is provided for swinging the fold-down seat from its outwardly facing position to a forwardly facing driving position.

In response to these described deficiencies in the prior art, it is an object of the present invention to provide a completely powered apparatus for moving a seat between a position where a physically disabled person may move to and from a wheelchair on the ground outside a vehicle, and a driving or other passenger position that is adjustable within the vehicle to accommodate differences in vehicle dimensions without the need for specially adapted equipment.

It is a further object of this invention to provide an apparatus for rotating a seat 90° between a driving position behind the steering wheel or another passenger position within the vehicle to a position outside and extending partially along a pivot post mounted within or forming part of the vehicle by exerting a force transverse the vehicle.

It is a further object and feature of this invention to provide an apparatus for supporting the seat that initially moves the seat laterally from its driving or passenger position before rotating the seat to its position outside the vehicle, and that moves the seat laterally in the opposite direction when the seat is pivoted back inside the vehicle.

It is a further object and feature of this invention to provide a connection between the seat and a power source that exerts a force laterally of the vehicle that adjusts for the pivotal and lateral movement of the seat.

It is a further object of this invention to provide such an apparatus that requires a minimum of the vehicle's interior space for installation and operation, and as a result enables full use of the vehicle's passenger and cargo areas, and is suitable for use in most automobiles.

It is, of course, a further object of this invention to provide an apparatus that is limited in the number of moving parts to reduce maintenance and repair Requirements.

SUMMARY OF THE INVENTION

The objects described above, as well as other objects and advantages, are achieved by a method and apparatus that contemplate the use of a seat including a back support and a frame for supporting the seat. A hinge assembly supports the seat for pivotal and lateral movement relative to the vehicle between a forwardly facing position inside the vehicle, such as a driving position behind the steering wheel of the vehicle, and an outwardly facing position outside a side door opening of the vehicle. Powered means are provided for exerting a lateral force on the seat to move the seat between the forwardly facing and outwardly facing positions. Lift means are carried by the seat frame to lift and lower the seat relative to the vehicle between the outwardly facing position and a lower position adjacent the ground where a disabled person may be transferred to or picked up from a wheel chair.

BRIEF DESCRIPTION OF THE DRAWINGS

In the drawings, wherein like reference characters are used throughout to describe like parts.

DETAILED DESCRIPTION OF THE PREFERRED EMBODIMENT

Figure 1:
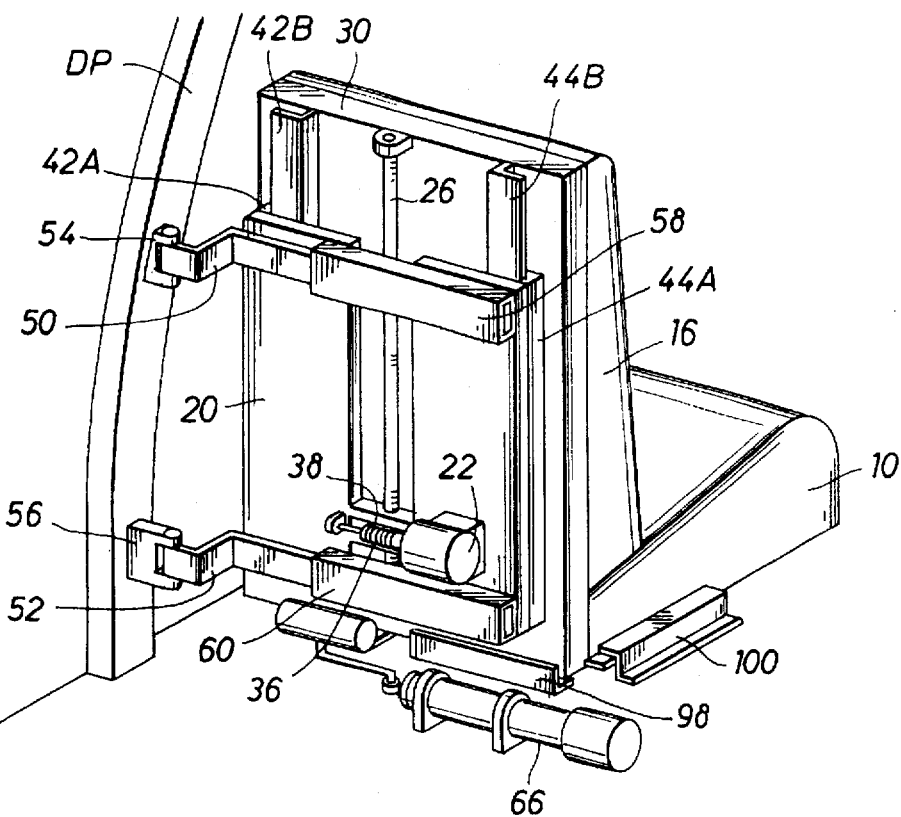
FIG. 1 is a perspective view of a seat according to the present invention positioned inside a vehicle facing forward in a driving position.
Figure 2:
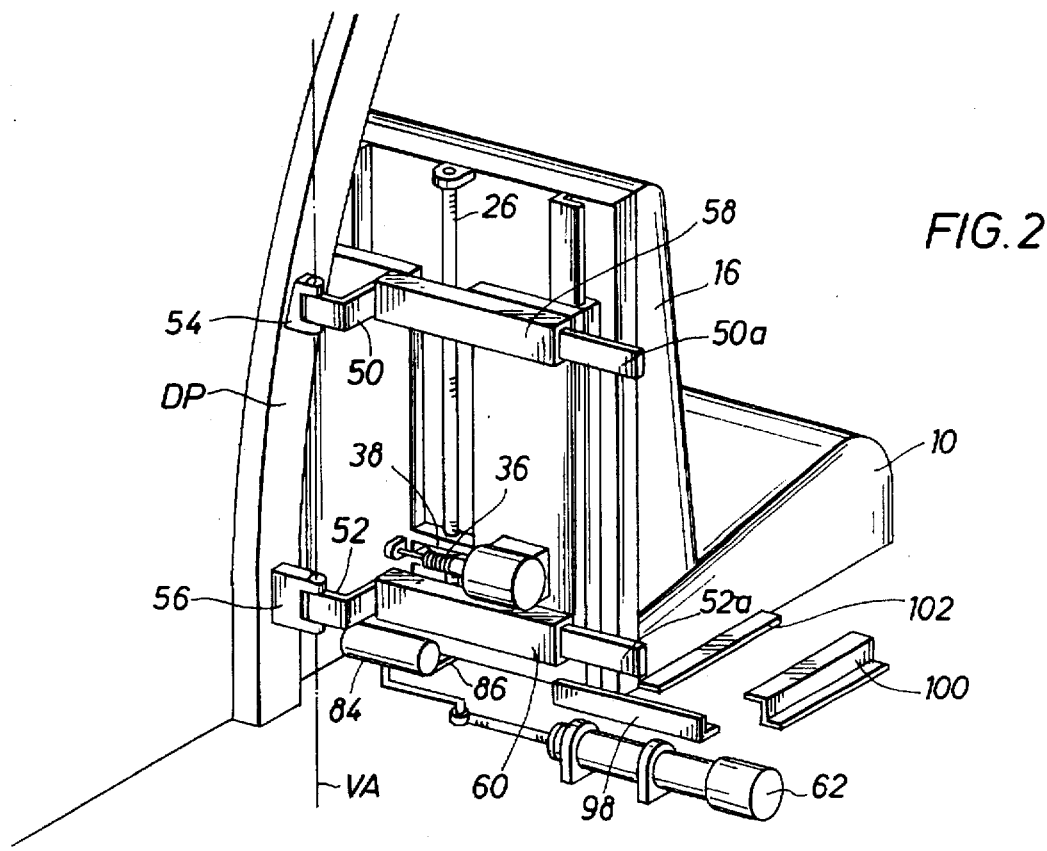
FIG. 2 is a perspective view of the seat shown laterally displaced from the position of FIG. 1 to a forwardly facing position adjacent the vehicle's door opening.
Figure 4:
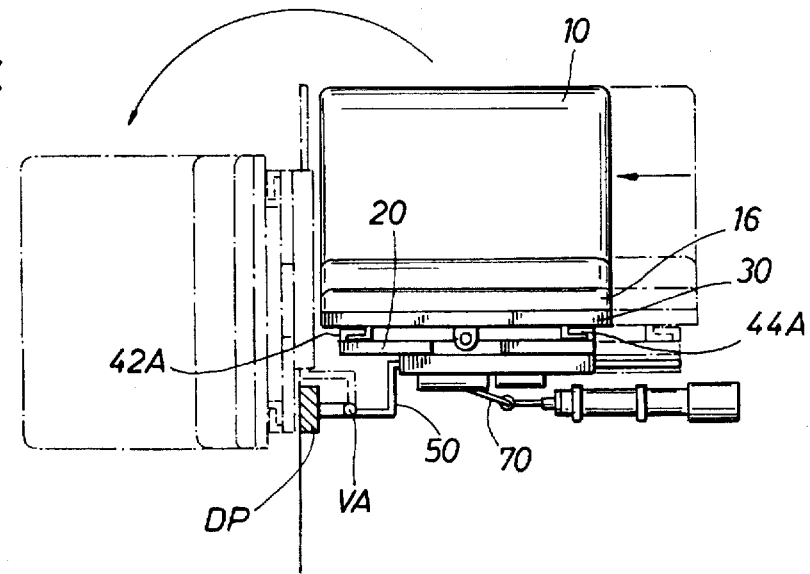
FIG. 4 is a plan view that illustrates the motion of the seat as it is moved laterally from the position of FIG. 1 to the position of FIG. 2, and then pivoted from the position of FIG. 2 to the position of FIG. 3.

As shown in FIGS. 1 and 2, transfer seat 10 includes back support 16 for supporting the seat. The seat and back support are both cushioned to comfortably support the disabled driver. Reinforcing plate 30 also forms part of the seat, and is connected to back support 16. The reinforcing plate is provided with L-shaped rails 42B and 44B that engage L-shaped rails 42A and 44A of seat frame 20, as shown in FIG. 4, to support the seat for up and down movement relative to seat frame 20.

Seat frame 20 carries means for moving the seat vertically relative to the vehicle. In the embodiment shown, such means includes reversible electric motor 22 that rotates worm 36 that rotates worm gear 38, which in turn causes lead screw 26 and the seat to move up or down depending on the direction of the motor's rotation.

Means are provided for supporting the transfer seat for pivotal and lateral movement between a sitting position within the vehicle, such as a forwardly facing position behind the steering wheel, and an outwardly facing position outside the vehicle. In the embodiment shown, a pair of hinges 54 and 56 are mounted on front door post DP to support the seat for such movement. Hinge plates 50 and 52 have respective offset sections 50a and 52a, resulting from two 90° bends in each of the plates, for pivoting the seat completely out of the vehicle.

In an alternate embodiment of the present invention, a non-factory-installed pivot post (not shown) is mounted in the vehicle for pivotally carrying hinge plates 50 and 52. Such an embodiment would be well suited for those vehicles having opposing dual opening side doors with the front side door being hinged at its forward edge and the back side door being hinged at its rearward edge. A particular application of this embodiment includes, for example, late model extended cab pickup trucks that lack a traditional "door post" between the dual opening side doors.

Lateral movement of the transfer seat is accomplished by mounting the seat on the hinge plates using sleeves 58 and 60 that allow movement of the seat along the hinge plates. The movement of the seat is described below.

In the preferred embodiment, particular problems involved in the movement of transfer seat 10 to and from a driving position are addressed. For example, if the transfer seat was merely pivoted from a position behind the steering wheel to a position outside the vehicle in one motion, the seat would have to be far enough from the steering wheel initially for the seat to clear the steering wheel when rotated. In many cases, depending on the size of the driver, this would require placement of the driver too far away from the steering wheel for his/her comfort. Therefore, it is an object and feature of this invention to move the seat laterally far enough from the driving position for the seat and driver to clear the steering wheel before the seat is pivoted outside. It follows that this invention further provides for the movement of the transfer seat laterally back to the driving position behind the steering wheel after the seat is rotated back into the vehicle.

Figure 7:
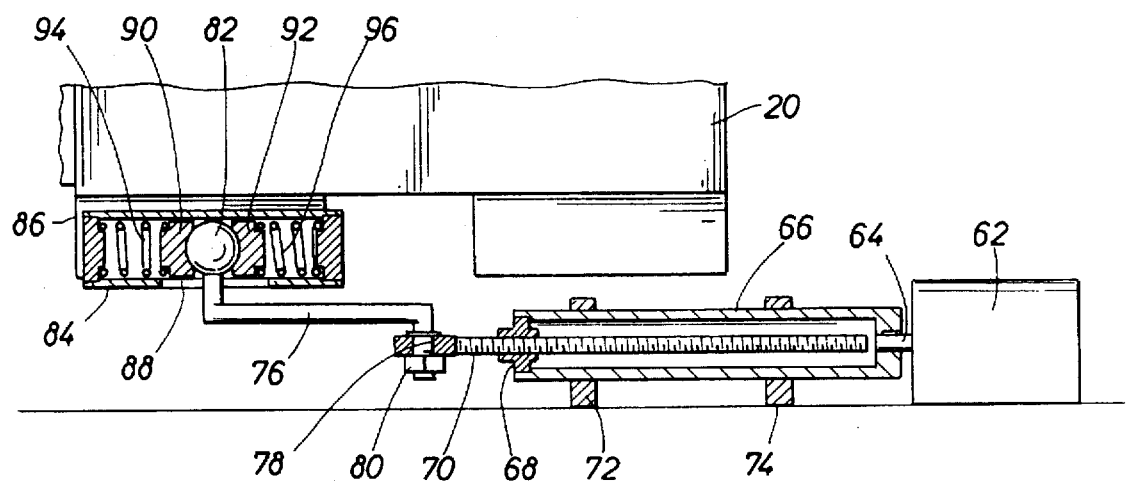
FIG. 7 is a fragmentary plan view, partly in section, showing in detail a means for moving the seat between the positions shown in FIGS. 1, 2, and 3.

Thus, means are provided for rotating seat 10 between an outwardly facing position outside the vehicle and an intermediate forwardly facing position in the vehicle. The rotating means includes reversible electric motor 62 mounted on the floor of the vehicle. As shown in FIG. 7, hollow tube 66 is supported in split bearing assembly 72, 74 for rotation by motor 62 through output shaft 64 which is keyed to the hollow tube. Nut 68 carried by tube 66 moves lead screw 70 axially. Pivot arm 76 is pivotally connected at one end to lead screw 70. The other end of the pivot arm is connected to guide ball 82.

Hollow tube 84 is attached to the lower portion of seat frame 20 via bracket 86. Hollow tube 84 has slot 88 through which the other end of the pivot arm extends. Guide ball 82 located in the hollow tube is connected to the end of the pivot arm. The slot enables the guide ball to travel back and forth within the hollow tube, according to the movement of pivot arm 76. The motion of guide ball 82 within the tube is controlled by a damping system, consisting of collars 90, 92 and coil springs 94, 96. Thus, the damping system ensures that pivot arm 76 and guide ball 82 induce smooth and deliberate rotating motion of the seat 10 between the outwardly facing and intermediate forwardly facing positions.

Motor 62 and drive screw 70 are also operable for sliding seat 10 relative to hinge plates 50, 52 laterally across the vehicle between the intermediate forwardly facing position, shown in FIG. 2, and the driving position behind the vehicle's steering wheel, shown in FIG. 1. The lower edge of seat frame 20 engages and slides across track 98 for a smooth transition between the intermediate and driving positions. In this manner, the steering wheel does not interfere with the pivoting motion of the seat as described above. Furthermore, the ultimate lateral position of the transfer seat may be adjusted to accommodate vehicles of varying widths, unlike the prior art devices. Stop 100 is mounted to the floor in a position to limit movement of seat 10 when flange 102 mounted to the seat engages the stop, and thereby defines the driving position.

It will be appreciated by those skilled in the art that motor 62 and drive screw 70 are used very efficiently for movement of the transfer seat between each of the outward, intermediate, and driving positions. As a result, the "footprint" of the apparatus closely approximates the space required for the seat, and cargo and passenger room is largely unaffected. Thus, the apparatus is suitable for use in virtually any vehicle, including compact automobiles.

The nominal, or stowed position for transfer seat 10 is thus seen as the driving position of FIG. 1. The seat is operated to position a physically disabled person in the driving position by a remote control panel (not shown) that is conveniently positionable for operation. In the first step, the control panel is used to energize motor 62, and rotate hollow tube 66 and nut 68 in a first direction to move drive screw 70 away from the motor.

The motion of drive screw 70 drives pivot arm 76 and pushes guide ball 82 against collar 90, compressing coil spring 94. Once coil spring 94 is sufficiently compressed, the force of guide ball 82 will be transmitted to hollow tube 84 and seat frame 20, as well as seat 10. When the transmitted force is sufficient to overcome the friction between sleeves 58, 60 and hinge plates 50, 52, respectively, and the friction between seat frame 20 and guide plate 98, seat 10 will be moved towards the door opening until it reaches the intermediate forwardly facing position shown in FIG. 2.

At this point, also shown in solid lines in FIG. 4, the sleeves reach the second 90-degree offset in the hinge plates, and the seat assembly can no longer move along the sleeves relative to the hinge plates. As a result, the force transmitted from drive screw 70 to seat frame 20 produces a moment about vertical axis VA, applied through hinge plates 50, 52. This moment, or torque, causes plates 50, 52 to be pivoted in hinges 54, 56 about the vertical axis.

Ball guide 82, which was pushed to the left of hollow tube 84 to compress coil spring 94 in the position of FIG. 2, is then partially directed towards the back of tube 84 as the hinge plates begin to pivot, allowing spring 94 to expand somewhat. As seat 10 is rotated further via the hinge plates, the force on ball guide 84 is applied along a line of action that approaches a position perpendicular to the axis of hollow tube 84, permitting the ball to assume a neutral position between springs 94 and 96.

Continued rotation of the seat assembly, including seat frame 20 and seat 10, by way of the hinge plates enables the driving force of motor 62 being applied through pivot arm 76 to push ball guide 82 towards the right side of hollow tube 84, compressing coil spring 96. This motion continues until the seat assembly is rotated to the outwardly facing position, shown in FIGS. 3 and 5. At this time, electric motor 62 is de-energized using the remote control panel or by an automatically activated switch (not shown).

When motor 62 is shut down, guide ball 82 will still be in a position on the right side of tube 84 compressing spring 96. The spring will thus apply resistive force to the ball that will be transmitted through drive screw 70 and hollow tube 66 as "back drive" to motor 62 that slightly rotates the motor in a second direction until ball guide 82 is returned to an unloaded neutral position.

Figure 5:
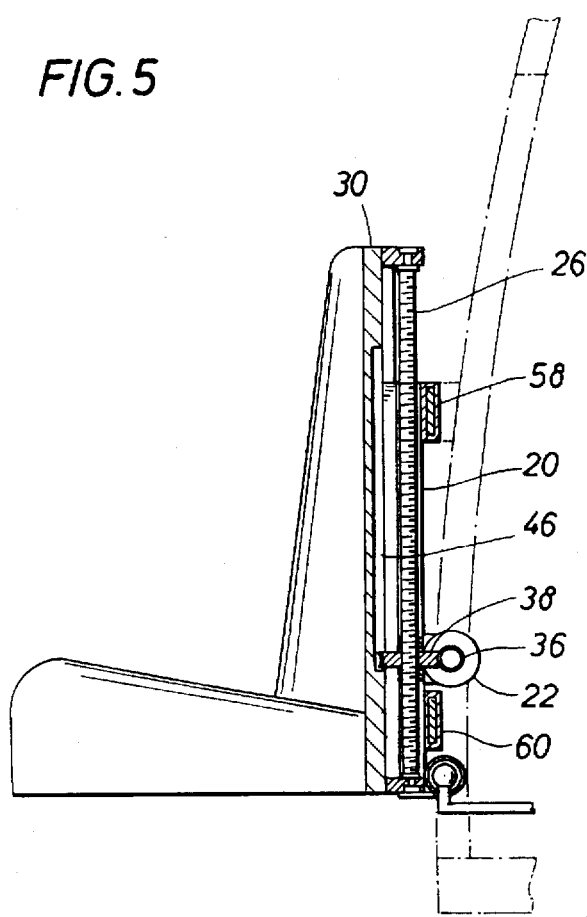
FIG. 5 is a side elevational view, partly in section, of the seat as positioned in FIG. 3 outside the vehicle.
Figure 6:
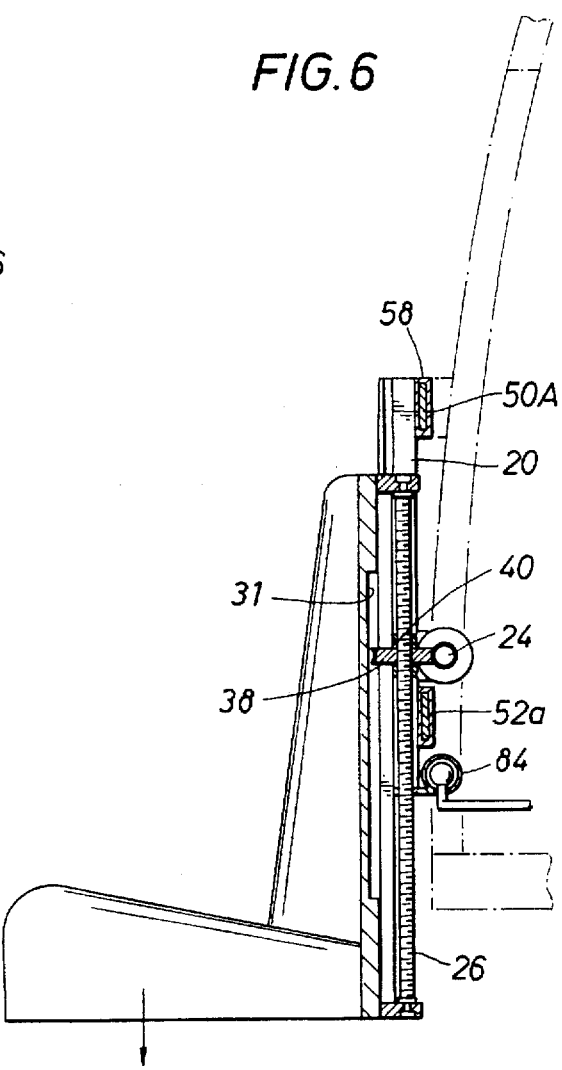
FIG. 6 is a side elevational view, partly in section, wherein the seat has been lowered to a position for the loading or unloading of a physically disabled user of the apparatus.

From the outwardly facing position of FIG. 5, seat 10 is lowered to the loading position, as shown in FIG. 6, by the operation of electric motor 22 via the remote control panel. Thus, motor 22 is energized via the control panel to rotate output shaft 24 and worm 36 in a first direction. The rotation of worm 36 causes it to rotate worm gear 38, driving lead screw 26, and seat 10 downwardly. Reinforcing plate 30 is provided with channel 31 that permits clearance of the plate as it is moved relative to worm gear 38. Channel 31 includes upper and lower shoulders that define, respectively, the lower and upper limits for vertical travel by the transfer seat. Thus, once the seat reaches its lower vertical limit by the engagement of worm gear 38 with the upper shoulder of channel 31, or another convenient loading position, motor 22 is de-energized using the remote control panel or other switch means (not shown).

Figure 3:
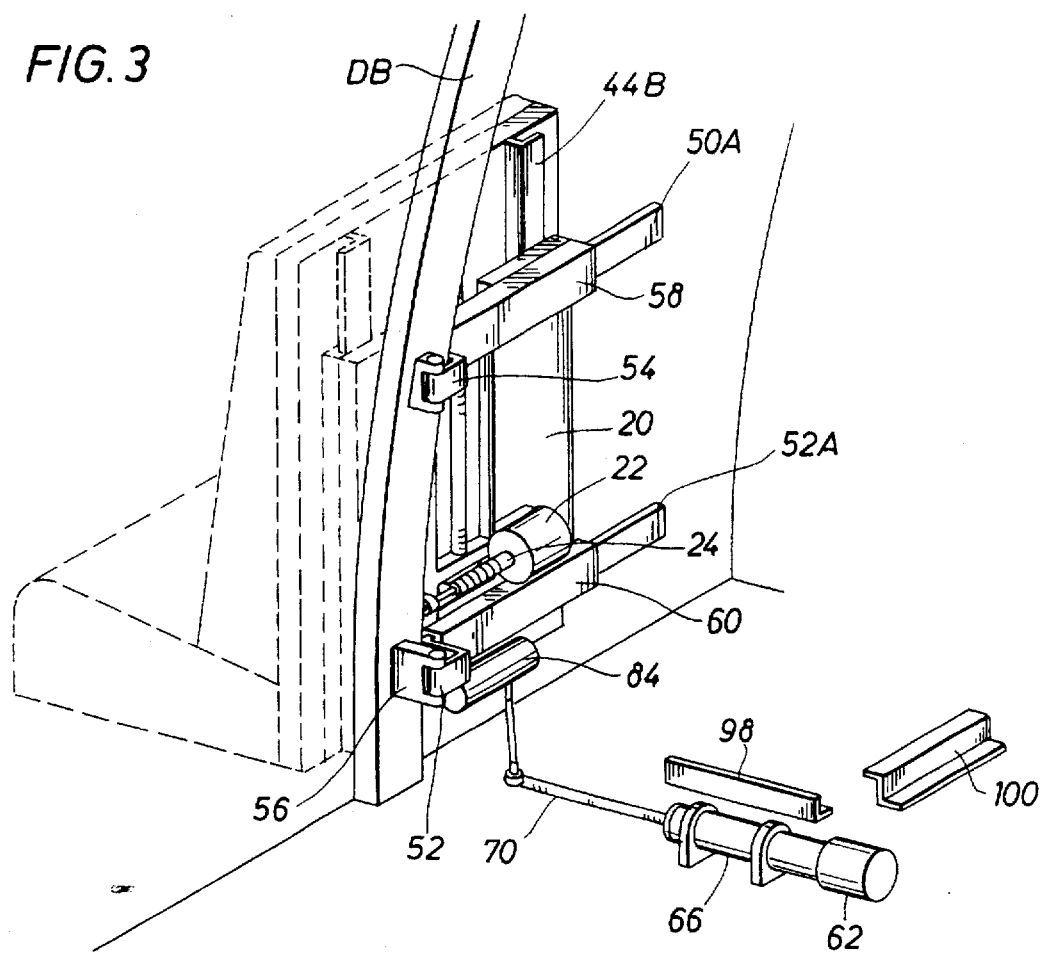
FIG. 3 is a further perspective view of the seat shown pivoted 90° from the position of FIG. 2 to an outwardly facing position outside the vehicle.

After the driver has been loaded onto transfer seat 10, the operating sequence is reversed using the control panel to lift the seat, by causing motor 22 to rotate output shaft 24 and worm 36 in a second direction, until the seat is lifted to the outwardly facing position. Then motor 22 is turned off, locking seat 10 in the outwardly facing position. Those skilled in the art will appreciate that lift seat 10 could be further provided with manual or electrical position locking means such as a solenoid (not shown) to ensure that the seat will not inadvertently fall from its raised outwardly facing position as shown in FIGS. 3 and 5.

Motor 62 is then energized to rotate tube 66 in a second direction, pivoting seat 10 into the vehicle by way of hinge plates 50, 52 until the seat reaches the intermediate forwardly facing position. As during the egress of the seat assembly, motor 62 is not turned off when the seat reaches the intermediate position, but continues to induce rotation of drive screw 70 to pull the seat assembly towards the driving position through pivot arm 76 and sleeves 58, 60. The driver, now positioned in seat 10 within the vehicle, knows that the driving position has been reached when flange 102 engages stop 100.

From the foregoing it will be seen that this invention is well adapted to attain all the ends and objects herein set forth, together with other advantages which are obvious and inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as being illustrative and not in a limiting sense.

For example, in an alternative embodiment (not depicted) of the present invention, the transfer seat lacks a cushion but is wide enough that the wheels of a standard wheelchair may be rolled onto a seat platform, and includes a locking mechanism for securing at least one of the wheelchair wheels to the platform. Thus, the transported person need not be moved from his or her wheelchair to the lift seat for positioning in a driving or passenger position. Of course, the vehicle in which this embodiment of the invention is utilized must include a side door opening of sufficient dimension for passage of a standard wheelchair through the door opening to a forwardly facing position behind the vehicle's steering wheel.

What is claimed is:

1. An apparatus for transferring a physically disabled driver through a vehicle's driver side door opening to and from a driving position behind the steering wheel of the vehicle, comprising:

a seat including a back support and a frame for supporting the seat;

a hinge assembly mounted on the driver's side door post of the vehicle for supporting the seat for pivotal movement between a position outside the vehicle facing outwardly from the vehicle and an intermediate position inside the vehicle facing forwardly;

means attached to the seat for allowing lateral movement of the seat relative to the hinge assembly between the intermediate forwardly facing position and a driving position behind the steering wheel;

powered means for applying force transverse the vehicle to move the seat between the outwardly facing position and the driving position; and lift means carried by the seat frame for lifting the seat to a position to move a disabled driver on the seat into the vehicle and lowering the seat to return the driver to the ground when the seat is in the outwardly facing position.

2. The apparatus of claim 1 wherein the seat is equipped with cushions for comfortably supporting the person to be transferred.

3. The apparatus of claim 1 wherein said lift means includes:

an electric motor carried by the seat frame; and a power screw carried by the seat frame and powered by said first electric motor for lifting and lowering said seat.

4. The apparatus of claim 1 wherein said hinge assembly includes a pair of hinges mounted on the driver's side door post, each hinge including a plate having a portion offset via two 90-degree bends in the plate for supporting the seat for rotation between an outwardly facing position outside the vehicle and an intermediate forwardly facing position inside the vehicle, and for lateral movement relative to the plate from the intermediate position to a position behind the steering wheel.

5. The apparatus of claim 4 wherein said powered moving means includes:

an electric motor mounted to the vehicle's floor;

a power screw powered by said electric motor for driving a pivot arm having a guide ball connected to one of its ends; and a hollow tube mounted to the seat frame and having a slot through which the pivot arm extends enabling the guide ball to travel back and forth within said hollow tube as the pivot arm is driven by said power screw to move said seat between the outwardly facing position and the driver's position.

6. Apparatus for moving a seat assembly between a forwardly facing sitting position within the vehicle and a position adjacent the ground where a disabled person can be picked up from and delivered to a wheelchair, comprising:

a seat having a back support and a seat frame;

a hinge assembly supporting the seat for pivotal movement with said hinge assembly and lateral movement relative to said hinge assembly between the forwardly facing sitting position within the vehicle and an outwardly facing position outside the side door opening of the vehicle;

powered means for exerting a lateral force on the seat to move the seat between the forwardly facing sitting position and the outwardly facing position; and lift means carried by the seat frame to lift and lower the seat relative to the vehicle between the outwardly facing position and a lower position adjacent the ground.

7. An apparatus for transferring a physically disabled person through a side door opening to and from a sitting position within the vehicle, comprising:

a seat assembly, including
a seat having a back support,
a seat frame for supporting the seat, and
lift means for lifting and lowering the seat relative to the seat frame;

a hinge assembly mounted inside the vehicle for pivoting said seat assembly about a vertical axis and enabling relative sliding motion of said seat assembly therealong;

means mounted to the vehicle's floor for laterally moving said seat assembly across the vehicle along said hinge assembly between the sitting position and an intermediate forwardly facing position inside the vehicle adjacent the side door opening; and means for rotating said seat assembly via said hinge assembly between the intermediate forwardly facing position and an outwardly facing position outside the vehicle wherein the seat may be moved between the outwardly facing position and a position adjacent the ground by the lift means.

8. A method of transferring a physically disabled person through a vehicle's side door opening to a forwardly facing sitting position within the vehicle, comprising the steps of:

opening a side door of the vehicle;

moving a transfer seat laterally across the vehicle from a forwardly facing sitting position within the vehicle to an intermediate forwardly facing position adjacent the side door opening with a first powered means;

rotating the transfer seat about a vertical axis from the intermediate forwardly facing position using the first powered means so that the transfer seat assumes an outwardly facing position outside the vehicle;

lowering the transfer seat to the ground from the outwardly facing position using a second powered means;

placing the disabled person on the transfer seat;

lifting the transfer seat and the disabled person to the outwardly facing position with the second powered means;

rotating the transfer seat and the disabled person about the vertical axis from the outwardly facing position using the first powered means so that the transfer seat assumes the intermediate forwardly facing position adjacent the side door opening; and moving the transfer seat and the disabled person with the first powered means laterally across the vehicle from the intermediate forwardly facing position to the forwardly facing sitting position.

9. The method of claim 8 wherein the forwardly facing sitting position is a driving position behind the steering wheel of the vehicle.

* * * * *